US008189654B2

(12) United States Patent
Yuan et al.

(10) Patent No.: US 8,189,654 B2
(45) Date of Patent: May 29, 2012

(54) RECEIVER

(75) Inventors: Allen Yuan, Victoria (AU); Holly He, Victoria (AU); Thanh Bui, Victoria (AU)

(73) Assignee: NEC Corporation, Tokyo (JP)

( * ) Notice: Subject to any disclaimer, the term of this patent is extended or adjusted under 35 U.S.C. 154(b) by 791 days.

(21) Appl. No.: 12/294,414

(22) PCT Filed: Mar. 29, 2007

(86) PCT No.: PCT/JP2007/057604
§ 371 (c)(1),
(2), (4) Date: Sep. 24, 2008

(87) PCT Pub. No.: WO2007/114478
PCT Pub. Date: Oct. 11, 2007

(65) Prior Publication Data
US 2009/0252214 A1    Oct. 8, 2009

(30) Foreign Application Priority Data
Mar. 31, 2006    (JP) ................. 2006-097704

(51) Int. Cl.
*H03H 7/30*    (2006.01)

(52) U.S. Cl. ........ 375/232; 375/229; 375/144; 375/148; 455/306; 455/307; 370/310; 370/320; 370/335

(58) Field of Classification Search .................. 375/232, 375/229, 148, 144; 370/310, 320, 335; 455/306, 455/307
See application file for complete search history.

(56) References Cited

U.S. PATENT DOCUMENTS

| 6,466,611 | B1 * | 10/2002 | Bachu et al. ................. 375/144 |
| 6,937,644 | B2 | 8/2005 | Pan et al. |
| 7,483,480 | B2 * | 1/2009 | Guo et al. .................... 375/232 |
| 7,684,479 | B2 * | 3/2010 | Hammerschmidt .......... 375/229 |
| 7,929,597 | B2 * | 4/2011 | Mergen et al. ................ 375/232 |
| 7,949,304 | B2 * | 5/2011 | Mostafa et al. ............. 455/63.1 |
| 2004/0136316 | A1 * | 7/2004 | Kwak et al. ................... 370/208 |
| 2007/0076791 | A1 * | 4/2007 | DiFazio et al. ............... 375/229 |

FOREIGN PATENT DOCUMENTS

| JP | 2000315966 A | 11/2000 |
| JP | 2004531109 A | 10/2004 |
| JP | 2005079836 A | 3/2005 |
| WO | 2006016722 A1 | 2/2006 |

OTHER PUBLICATIONS

H.R. Karimi, "Efficient Mutli-Rate Multi-User Detection for the Asynchronous WCDMA Uplink", 1999 IEEE 50th Vehicular Technology Conference, vol. 1, Feb. 4, 2000, pp. 593-597.
International Search Report for PCT/JP2007/057604 mailed Jul. 10, 2007.
Chinese Office Action for CN200780011342.1 issued Oct. 26, 2011.
Y. Guo et al., "Efficient MIMO Equalization for Downlink Multi-Code CDMA: Complexity Optimization and Comparative Study", IEEE Communications Society Globecom 2004, pp. 2513-2519.

* cited by examiner

*Primary Examiner* — Eva Puente

(57) ABSTRACT

A receiver in which computation is simplified can be obtained by using a common factor for filter coefficients of FIR filters corresponding to a plurality of transmitting antennas and by using only the middle column of an inverse matrix of a gain matrix when the common factor is computed.

9 Claims, 3 Drawing Sheets

System of Liner
equations = Forward

System of Liner
equations = Backward

RECEIVER

TECHNICAL FIELD

The present invention relates to an equalizer and a receiver including such an equalizer, and more particularly to an equalizer used in a radio communication system utilizing a W-CDMA (Wideband Code Division Multiple Access) method, a receiver including such an equalizer, and an arithmetic method.

RELATED ART

Generally, this type of W-CDMA methods is a radio communication method in which different codes and a plurality of carrier waves are multiplied together and multiplexed, and a spread spectrum is then performed, and is used in radio communication such as cellular phones. Furthermore, global standards used in the third-generation mobile communication are defined for the W-CDMA methods by 3GPP (3$^{rd}$ Generation Partnership Project).

Meanwhile, a transmit diversity method in which data are transmitted with use of two antennas has been used for downlink from each base station to a mobile station such as a cellular phone. The STTD (Space Time block coding based Transmit antenna Diversity) method, the TSTD (Time Switched Transmit Diversity) method, and the closed loop transmit diversity mode I (CLM1) method are defined as transmit diversity methods by the 3GPP.

Among those methods, the STTD method is a method of encoding the same transmitting data and transmitting them simultaneously from two antennas. This method can reduce the level fluctuation of receiving data. Furthermore, the TSTD method is a method of switching transmitting antennas at each slot of a radio frame. Moreover, the CLM1 method is a method of operating based on downlink information fed back to a base station from a mobile station.

Meanwhile, this type of communication systems includes a system in which base stations that transmit and receive data by either one of the aforementioned transmit diversity methods and base stations that transmit and receive data by another transmit diversity method are mixed. Furthermore, in another system, a base station does not use any of the aforementioned transmit diversity methods.

In order to deal with such situations, Japanese laid-open patent publication No. 2005-79836 (Patent Document 1) has proposed a receiving apparatus that determines the use of antenna diversity and performs receiving/demodulating processes according to the determination result. Specifically, Patent Document 1 discloses a receiving apparatus having a plurality of CPICH (Common Pilot Channel) receiving parts corresponding to a plurality of antennas, a plurality of SCH (Synchronization Channel) receiving parts for demodulating SCH with use of propagation-path estimates obtained by the CPICH receiving parts, and a judging part for judging with use of the demodulated SCH whether or not the STTD method is used for CCPCH (Common Control Physical Channel) of the received signals.

In the receiving apparatus shown in Patent Document 1, CCPCH is demodulated with use of a propagation-path estimate obtained by each CPICH receiving part. When the STTD method is used for CCPCH, a STTD demodulation process is performed on the CCPCH.

U.S. Pat. No. 6,937,644 (Patent Document 2) discloses a radio transmitting and receiving apparatus having a sampling device, a channel estimation device, a channel equalizer, and a despreader. Furthermore, the channel equalizer equalizes a received vector with use of a channel response matrix (H) and a noise variance ($\sigma^2$) obtained from the channel estimation device and outputs a spread symbol vector. The despreader despreads the spread symbol vectors obtained from the channel equalizer with using codes of the received signals and produces estimated symbols.

Moreover, WO2006/016722A1 (Patent Document 3) discloses a filter coefficient arithmetic method capable of reducing the number of operations relating a filter coefficient of an FIR filter.

DISCLOSURE OF INVENTION

Problem(s) to be Solved by the Invention

Patent Document 1 can improve demodulation characteristics of SCH by selecting a proper input signal in an SCH demodulation process system, irrespective of whether or not the TSTD method is used for SCH, after slot synchronization, frame synchronization, and scrambling code identification.

However, Patent Document 1 only judges the use of the STTD method and fails to disclose processes subsequent to the selection of the input signal. Furthermore, Patent Document 1 also fails to describe an arithmetic method for a filter coefficient of an FIR filter.

Furthermore, while a code block diagonal matrix is obtained by processing a signal code using a filter block Fourier transform (FT) described in Patent Document 2, a channel response of the received signal is estimated and extended to produce a channel response block diagonal matrix. Moreover, the received signal sampled is processed with use of a combination of the channel response block diagonal matrix and the aforementioned code block diagonal matrix with a Cholesky algorithm. Furthermore, a block inverse FT is performed based on the result of the Cholesky algorithm to produce spread symbols. The spread symbols are despread to recover the received signals.

Thus, Patent Document 2 discloses that an inverse FT is performed to recover the received signals but fails to disclose any means for coping with different transmit diversity methods or any chip equalizer including an FIR filter. Therefore, Patent Document 2 fails to describe an increase of the computational complexity caused by computation for a filter coefficient of an FIR filter and fails to show any method for simplifying computation for a filter coefficient.

As described above, this type of CDMA receivers uses a chip level equalizer (CLE) for equalizing and detecting PN sequence of spread sequence. This chip equalizer produces a chip estimate from input data by controlling a coefficient of an FIR filter.

Matrix inverse operation is used to compute a coefficient of an FIR filter. The matrix inverse operation requires operations such as matrix decomposition operation, forward substitution, and backward substitution. Although those operations are relatively easy in a case of a single transmitting antenna, the computation becomes very complicated in a case of the transmit diversity or the like, where a plurality of antenna are used.

Patent Document 3 discloses an arithmetic method capable of reducing the amount of computation required for a coefficient of an FIR filter. However, Patent Document 3 does not consider the use of transmit diversity methods.

An object of the present invention is to provide a receiver capable of reducing the amount of computation required for coefficients of FIR filters in a case of a transmit diversity method.

The present invention seeks to provide a receiver capable of symbol recovery by performing different operations in cases of an STTD method and a CLM1 method.

The present invention seeks to provide an arithmetic method capable of reducing the amount of computation required for filter coefficients of FIR filters in a case of a transmit diversity method.

Means to Solve the Problem

According to an aspect of the present invention, there is provided a receiver having a plurality of FIR filters and being capable of communicating with a transmitting part using a transmit diversity method through a transmission path with use of the plurality of FIR filters, characterized by comprising a processing arithmetic circuit operable to compute a filter coefficient w of each of the FIR filters with a common factor ($c_0$) and output the filter coefficients w to the plurality of FIR filters.

In this case, the filter coefficient is represented by the following formula:

$$w_g = c_0{}^H \underline{H}_g{}^H \quad (1)$$

where g is 1 or 2, the superscript H represents a Hamilton transpose, and $\underline{H}_g$ is an estimated channel response matrix of the transmission path.

Furthermore, the common factor $c_0$ is derived by representing a gain matrix G of the transmission path with channel response matrices $H_1$ and $H_2$ corresponding to the transmit diversity method by the following formula:

$$G = \underline{H}_1{}^H H_1 + \underline{H}_2{}^H \underline{H}_2 + \beta I \quad (2)$$

where β is a noise figure added in the transmission path, and I is a unit matrix.

According to an aspect of the present invention, there is provided a receiver characterized in that the common factor $c_0$ is computed by performing forward substitution and backward substitution on a lower triangular matrix L obtained by performing Cholesky decomposition on the formula (2).

In this case, the forward substitution is performed by computing a row vector d in accordance with the following formula:

$$Ld = e_{(N+1)/2} = [e_1, e_2, \ldots e_N]^T \quad (3)$$

where N is the number of vector components of a matrix, $e_i$ is a column vector having 1 in cases of i=(N+1)/2 and 0 in other cases.

Moreover, according to an aspect of the present invention, there is provided a receiver characterized in that d=d[(N−1)/2,(N−2)/2, . . . N−1] is used as the row vector d for the subsequent backward substitution.

Furthermore, in the backward substitution, the common factor $c_0$ is computed in accordance with the following formula (4):

$$\underline{L}^H c_0 = \underline{d} \quad (4)$$

where $$\underline{L}^H[i,j] = \underline{L}^H[i+(N-1)/2, j+(N-1)/2] \forall 0 \leq i,j \leq (N-1)/2.$$

Moreover, the common factor $c_0$ is represented by the following formula (5):

$$c_0[(N-1)/2+k] = \underline{c}_0[k], c_0[k] = c_0[N-1-k]^*, k = 0, \ldots, (N-1)/2 \quad (5)$$

Furthermore, the filter coefficient w is derived by performing Hamilton transpose on the common factor $c_0$ obtained by the formula (5) to obtain $c_0{}^H$ and then performing the computation of the formula (1).

According to another aspect of the present invention, there is provided a receiver characterized in that the receiver is used to communicate with a transmitting part which transmits symbols Sg(0), Sg(1), Sg(2), . . . (g=1 or 2) to HS-DSCH/HS-SCCH via two transmitting antennas by selectively using an STTD method and a CLM1 method as the transmit diversity method, and the receiver has a processing part operable to output symbol estimates S(0), S(1), S(2), . . . in accordance with the formula (6) in the case of the STTD method and in accordance with the formula (7) in the case of the CLM1 method:

$$\underline{S}(2i) = S1(2i) + S2(2i+1)^*, \underline{S}(2i+1) = S1(2i+1) - S2(2i)^* \quad (6)$$

$$\underline{S}(i) = S1(i) + S2(i) \times W2 \quad (7)$$

where i=0, 1, 2, . . . and W2 is a weight corresponding to a second transmitting antenna.

Effect(s) of the Invention

The present invention makes it possible to obtain a receiver capable of computing filter coefficients of a plurality of FIR filters with a relatively small amount of computation. As a result, this type of receivers can be put into practice.

BEST MODE FOR CARRYING OUT THE INVENTION

Figure 1:
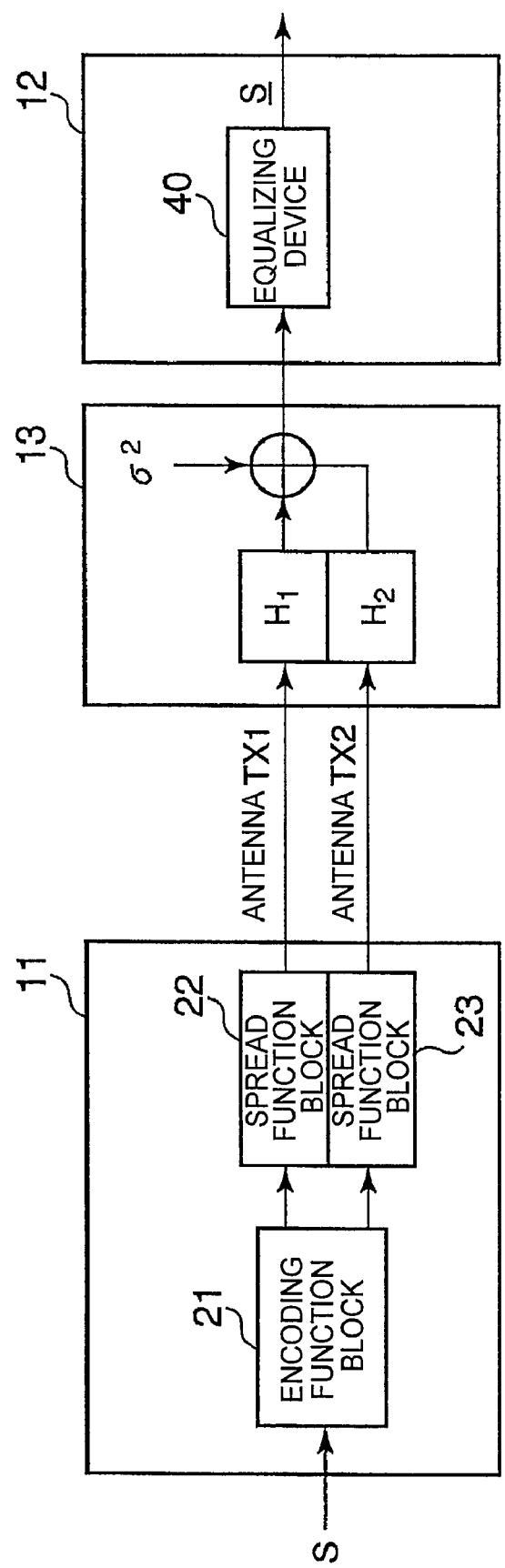
FIG. 1 is a functional block diagram showing an equivalent of a communication system to which the present invention can be applied.

Referring to FIG. 1, there is shown an equivalent of a communication system according to the present invention, i.e., a communication system using a transmit diversity method. The illustrated communication system is formed by a base station or the like. The communication system includes a transmitting part 11 having a plurality of transmitting antennas (two transmitting antennas in this example) Tx1 and Tx2, a receiving part 12 formed by a mobile station such as a cellular phone, and a transmission path 13 between the transmitting part 11 and the receiving part 12.

The illustrated transmitting part 11 is characterized by an encoding function block 21 for encoding a transmitting symbol S in accordance with the STTD method or adding a weight to a transmitting symbol S in accordance with the CLM1 method and outputting the encoded signals and two spread function blocks 22 and 23 for spreading the outputs of the encoding function block 21 with a spread code. (This embodiment only describes a case in which the outputs of the encoding function block 21 are spread with a PN sequence.) In the illustrated example, the signals spread with chip signals in the spread function blocks 22 and 23 are outputted from the two transmitting antennas Tx1 and Tx2 to the transmission path 13.

Thus, the transmitting part 11 shown in FIG. 1 performs transmission via the two transmitting antennas Tx1 and Tx2 with the transmit diversity method. The illustrated transmitting part 11 will be described as performing transmission with selectively using the STTD method and the CLM1 method. Nevertheless, a transmitting part 11 using a different transmit diversity method may be present in the communication system. In the case of the TSTD method, it is not necessary to employ the present invention because its transmission rate is low. Therefore, this embodiment describes a case in which the STTD method and the CLM1 method are selectively used.

Furthermore, in the case where a transmit diversity method is used, the transmission path 13 can be illustrated equivalently as shown in the drawing. Specifically, the transmission path 13 using a transmit diversity method can be represented by a first multipath for propagating a transmitting signal from the transmitting antenna Tx1, a second multipath for propagating a transmitting signal from the transmitting antenna Tx2, and a noise added in those multipaths. In FIG. 1, the first and second multipaths are equivalently represented by spread channel response matrices $H_1$ and $H_2$, a noise added in the transmission path 13 (a variance $\sigma^2$ of a noise in this example), the spread channel response matrices $H_1$ and $H_2$, and the noise. In other words, the input data r inputted to the receiving part 12 can be demodulated and recovered by forming an inverse system to the transmission path 13.

Meanwhile, the illustrated receiving part 12 is characterized solely by an equalizing device 40 according to the present invention. The equalizing device 40 recovers a symbol S from the input data r received via the transmission path 13. Specifically, the equalizing device 40 according to the present invention utilizes direct matrix inverse approach and computes filter coefficients of FIR filters by a direct matrix inverse method. In this case, the equalizing device 40 according to the present invention has a configuration capable of recovering and demodulating signals encoded by a plurality of different transmit diversity methods (the STTD method and the CLM1 method in this example) so as to correspond to those transmit diversity methods and can compute filter coefficients necessary for the plurality of transmit diversities with a relatively small amount of computation.

The equalizing device 40 according to the present invention will be described in detail with reference to FIG. 2.

Figure 2:
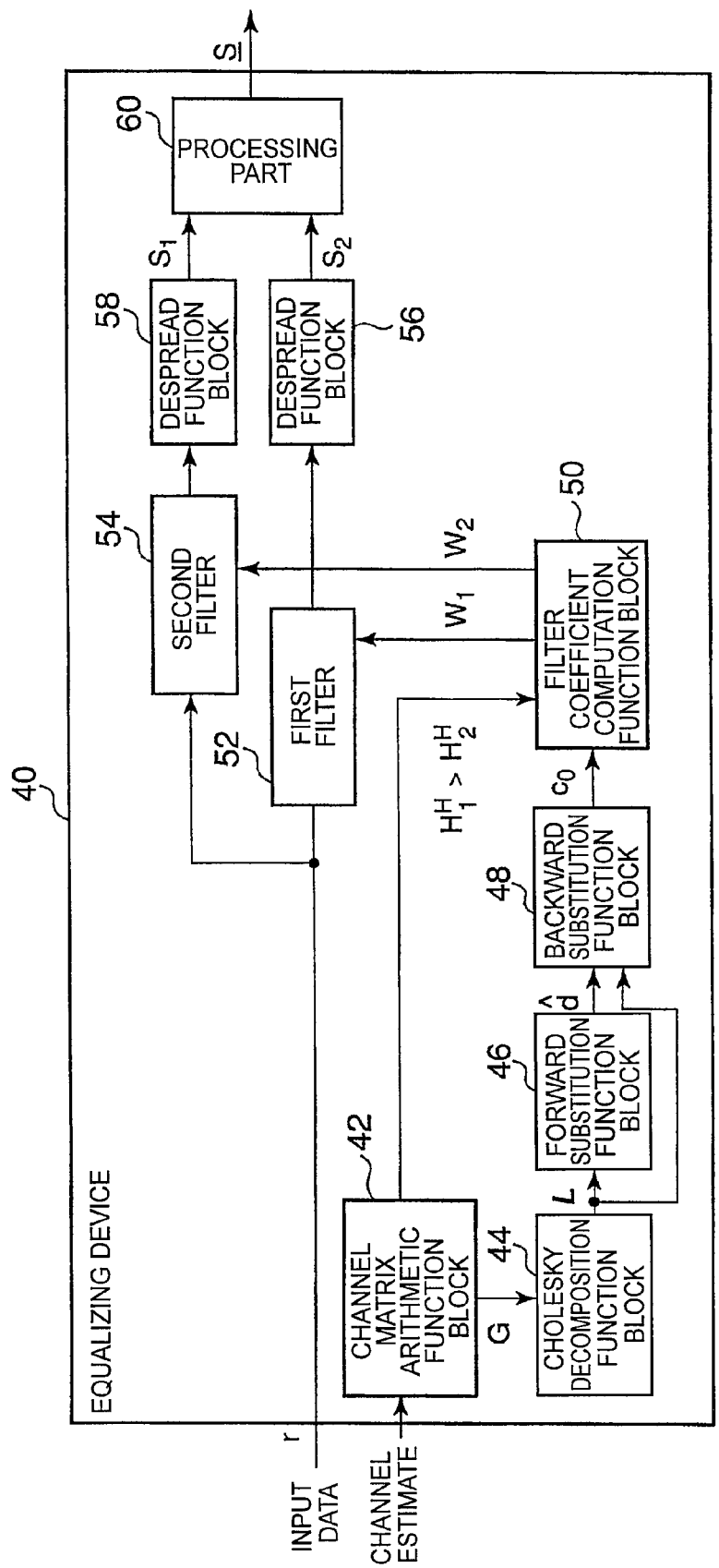
FIG. 2 is a functional block diagram showing an equalizing device according to the present invention.

The equalizing device 40 shown in FIG. 2 is supplied with the input data r and also with channel estimates from a channel estimation device, which is not shown. In this example, it is assumed that the input data r are normal communication data after performing cell search operations such as slot synchronization, frame synchronization, code group identification, and scrambling code identification.

The equalizing device 40 estimates a channel response of the transmission path 13 to a signaling pulse, produces an inverse system to the transmission path 13, and connects the inverse system to the transmission path 13 in series, thereby compensating the interference between the multipaths. Specifically, the equalizing device 40 implements an inverse system by FIR filters and operates as a chip equalizer configured to accurately reproduce a chip signal corresponding to a PN sequence in the input data r.

The channel estimation device provided on the receiving part 12 estimates channel response matrices $H_1$ and $H_2$ of the two multipaths forming the transmission path 13. The estimated channel response matrices $H_1$ and $H_2$ as results of the estimation are supplied as channel estimates to the equalizing device 40. In the illustrated example, an estimate β of a noise figure (scalar) β, which represents a noise, is assumed to be given. The computation for an estimate of a noise figure is described by Japanese laid-open patent publication No. 2006-54900 and is not be described herein in detail.

For simplicity, the two channel response matrices $H_1$ and $H_2$ corresponding to the two multipaths which have been estimated by the channel estimation device are represented by $H_g$. (In this example, g is 1 or 2.) First, it is assumed that the input data r are supplied through L multipaths from the gth transmitting antenna and that its estimate is represented by $h_l^g$. Here, l=0, 1, 2, . . . L−1. In this case, a channel estimate can be represented by the following channel response matrix $H_g$.

$$H_g = \begin{bmatrix} h_0^g & 0 & \cdots & 0 \\ h_1^g & h_0^g & \ddots & \vdots \\ \vdots & h_1^g & \ddots & 0 \\ h_{L-1}^g & \vdots & \ddots & h_0^g \\ 0 & h_{L-1}^g & \ddots & h_1^g \\ \vdots & \ddots & \ddots & \vdots \\ 0 & \cdots & 0 & h_{L-1}^g \end{bmatrix}$$

The channel response matrix $H_g$ estimated by the channel estimation device is supplied to a channel matrix arithmetic function block 42 of the illustrated equalizing device 40. A gain matrix G corresponding to the channel response matrix $H_g$ is computed in the channel matrix arithmetic function block 42.

Meanwhile, in a communication system that does not use a transmit diversity method, a gain matrix G is represented by $$G = H^H H + \beta I$$

where $H^H$ is a correlation matrix of the estimated channel response matrix H (i.e., a Hamilton transposed matrix of H) and I is a unit matrix.

When a plurality of transmitting antennas are provided, a gain matrix is usually computed individually for a multichannel corresponding to each transmitting antenna. In practice, however, when a gain matrix is individually computed for each multichannel to obtain an inverse matrix, the amount of computation becomes so large as to make the practical application to cellular phones or the like difficult.

Therefore, according to the present invention, the transmission path 13 is represented as shown in FIG. 1, and a single gain matrix G is used to form an inverse system.

$$G = H_1^H H_1 + H_2^H H_2 + \beta I \qquad (8)$$

The superscript letter H means a Hamilton transposed matrix of a matrix.

Here, $H_1$ and $H_2$ are estimates of channel response matrices of the two multipaths, $H_1^H$ and $H_2^H$ are Hamilton transposed matrices of $H_1$ and $H_2$, respectively, I is a unit matrix, and β is an estimate of a noise figure. The estimate of a noise figure can be computed by the aforementioned method.

The channel response matrix arithmetic function block 42 of the equalizing device 40 shown in FIG. 2 receives estimates $H_1$ and $H_2$ of the channel response matrix and an estimate β of a noise figure which are provided by the channel estimation device, computes $H_1^H$ and $H_2^H$, and computes a gain matrix G in accordance with the formula (8).

The channel response matrix arithmetic function block 42 is a block for performing the above operations and outputs the Hamilton transformation matrices $H_1^H$, $H_2^H$, and a gain matrix G, which have been computed by the block 42.

Among the outputs of the channel response matrix arithmetic function block 42, the gain matrix G is supplied to a Cholesky decomposition function block 44, which performs a process of Step 1.

The Cholesky decomposition function block 44 performs Cholesky decomposition on the gain matrix G (Step 1) to compute a lower triangular matrix L and an upper triangular matrix U of the gain matrix G.

The lower triangular matrix L computed by the Cholesky decomposition function block 44 is supplied to a forward substitution function block 46, which performs a process of Step 2, and a backward substitution function block 48, which performs a process of Step 3. In the function blocks 46 and 48, forward substitution (Step 2) and backward substitution (Step 3) as described later are performed to compute solutions ($\underline{d}$ and $c_0$) of the system equation.

Next, in Step 4, the solution $c_0$ obtained by the backward substitution function block 48 (i.e., Step 3) and matrices $H_1^H$ and $H_2^H$ computed by the channel matrix arithmetic function block 42 are supplied to a filter coefficient computation function block 50. This function block 50 computes weight vectors ($w_1$ and $w_2$ in this example) representing filter coefficients by using the aforementioned solution $c_0$ and matrices $H_1^H$ and $H_2^H$.

The equalizing device 40 shown in FIG. 2 includes a plurality of FIR filters (first and second FIR filters 52 and 54 in this example) corresponding to a plurality of transmitting antennas Tx1 and Tx2 used in a transmit diversity method. Each of the FIR filters 52 and 54 is supplied with the input data r and is also supplied with the weight vector $w_1$ or $w_2$ as a filter coefficient from the filter coefficient computation function block 50. An inverse system of the transmission path 13 is implemented by suitably changing the filter coefficients.

Here, the optimum weight vectors $w_1$ and $w_2$ for the first and second FIR filters 52 and 54 are represented by the middle column of the following weight matrix $\underline{W}g$.

$$\underline{W}_g = G^{-1} \underline{H}_g^H$$

To compute the middle column of the above matrix means that only the middle column of $G^{-1}$ is necessary for the multiplication by $\underline{H}_g^H$. The computation for the optimum weight vectors will be described later.

The input data r supplied to the first and second FIR filters 52 and 54 are equalized by the FIR filters 52 and 54 and then supplied to first and second despread function blocks 56 and 58, respectively. When the filter coefficients of the FIR filters 52 and 54 are optimized by the optimum weight vectors $w_1$ and $w_2$, respectively, then despreading operation is performed while chip equalization is performed. Despread symbols $\overline{S1}$ and $\overline{S2}$ are outputted from the despread function blocks $\overline{56}$ and $\overline{58}$.

The despread symbols $\overline{S1}$ and $\overline{S2}$ outputted from the despread function blocks $\overline{56}$ and $\overline{58}$ are supplied to a processing part 60. The processing part 60 performs a process corresponding to the STTD method or the CLM1 method to produce a demodulation symbol S.

Hereinafter, there will be described the algorithm used in arithmetic operations performed from the channel matrix arithmetic function block 42 to the filter coefficient computation block 50.

First, in the channel matrix arithmetic function block 42, the gain matrix G is computed in accordance with the operation represented by the formula (8), i.e., $G = \underline{H}_1^H \underline{H}_1 + \underline{H}_2^H \underline{H}_2 + \beta I$. As is apparent from the formula (8), the $\overline{gain}$ $\overline{matrix}$ G is a Hamilton matrix and is a real number.

This means that the gain matrix G can be represented with a unique upper (lower) triangular matrix L (U) by $G = LL^H = U^H U$.

When filter coefficients of the FIR filters 52 and 54 are to be computed in the equalizing device 40 according to the present invention, it is necessary to compute an inverse matrix $G^{-1}$ of the gain matrix G. In fact, however, direct computation of an inverse matrix $G^{-1}$ increases the computational complexity, thereby causing a problem in practical use. Therefore, $G^{-1}$ is computed using the following formulas (9) and (10) by procedures of steps a, b, and c.

Specifically, it has generally been known that a matrix G and its inverse matrix $G^{-1}$ have the following relationship.

$$GG^{-1} = I \leftrightarrow L(L^H G^{-1}) = I \leftrightarrow LD = I \quad (9)$$

Here, I is a unit matrix and D is represented by the following formula.

$$L^H G^{-1} = D \quad (10)$$

The computation is performed using the formulas (9) and (10) by the following steps a, b, and c.

Step a: Cholesky decomposition is performed on a channel response matrix G to obtain a lower triangular matrix L.

Step b: A solution for the formula (9) is computed. In this case, forward substitution is performed on the lower triangular matrix L to obtain a matrix D. Since a unit matrix I is given, the matrix D can be computed.

Step c: The solution for the formula (10) is computed. In this case, backward substitution is performed on the matrices D and $L^H$ to obtain an inverse channel response matrix $G^{-1}$.

However, a linear system is represented by N equations multiplied by N unknowns. (In other words, the matrices D and $G^{-1}$ are an N×N matrix.) Therefore, the computational complexity is $O(N^3)$ in the above steps b and c.

This computational complexity is a great factor to inhibit practical application to devices used in an actual communication system.

The equalizing device 40 according to the present invention as shown in FIG. 2 performs the following arithmetic operations so as to reduce the amount of computation in the steps b and c from $O(N^3)$ to $O(N^2)$ and is thus applicable to a practical communication system.

As illustrated, the equalizing device 40 according to the present invention has the following basic function blocks as described above.

1. The channel matrix arithmetic function block 42 for computing a channel response matrix $\underline{H}$ and G based on inputted channel estimates.

2. The Cholesky decomposition block 44 for performing Cholesky decomposition on the channel response matrix G to obtain a lower triangular matrix L and an upper triangular matrix U.

3. The forward substitution function block 46. This block performs computation with the lower triangular matrix L to obtain a solution for a system equation. Specifically, $$Ld = e_{(N+1)/2} = [e_1, e_2, \ldots e_N]^T \quad (11)$$

where $e_i = 1$ if $i = (N+1)/2$, and otherwise $e_i = 0$.

Thus, a row vector d is obtained. In other words, by introducing a vector e in which only vector components corresponding to the middle column is 1 while other components are 0, rather than unit matrix I, the computation for the row vector d can remarkably be simplified. As a result, only a half of the row vector d ($d = d[(N-1)/2, \ldots N-1]$) is inputted as an arithmetic resultant $\overline{vector}$ d to the subsequent function block 48.

Figure 3:
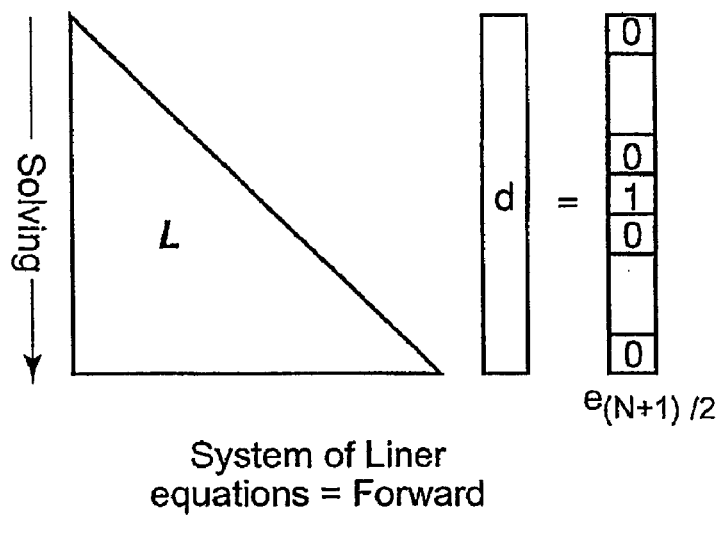
FIG. 3 is a diagram explanatory of forward substitution performed in an equalizing device according to the present invention.

FIG. 3 is a conceptual diagram showing a forward substitution step performed in this block. It can be seen that the computation to obtain a row vector d is simplified by using the formula (11) instead of the formula (9).

4. The backward substitution function block 48 (Step 3). As shown in FIG. 2, the aforementioned half of the row vector d computed in the forward substitution function block 46 (Step 2) and the lower triangular matrix L computed in the Cholesky decomposition function block 44 (Step 1) are inputted to the backward substitution function block 48. This block 48 performs computation with use of the following formula (12) instead of the formula (10) (Step 4). Specifically, the backward substitution function block 48 obtains a Hamilton transposed matrix $L^H$ from the lower triangular matrix L and performs the following operations with use of the Hamilton transposed matrix $L^H$ and the half of the row vector d (Step 4):

$$\underline{L}^H \underline{c}_0 = \underline{d} \quad (12)$$

where $$\underline{L}^H[i,j] = \underline{L}^H[i+(N-1)/2, j+(N-1)/2] \forall 0 \leq i,j \leq (N-1)/2.$$

Figure 4:
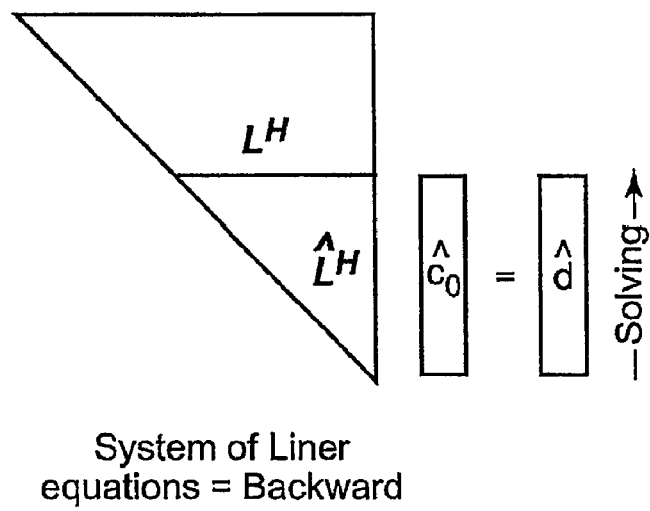
FIG. 4 is a diagram explanatory of backward substitution performed in an equalizing device according to the present invention.

FIG. 4 is an explanatory diagram of backward substitution performed in this block 48. It can be seen that computation for $c_0$ which corresponds to the computation for the inverse matrix $G^{-1}$ in the formula (10) can remarkably be simplified. All vectors of $c_0$ are represented by the following formula.

$$c_0[(N-1)/2+k] = \underline{c}_0[k], c_0[k] = c_0[N-1-k]^*, k=0, \ldots, (N-1)/2 \quad (13)$$

5. The filter coefficient computation block 50 (Step 4) is a block for obtaining a vector $w_0$ for filter coefficients. This block 50 is supplied with the Hamilton transposed matrices $H_1^H$ and $H_2^H$ from the channel matrix arithmetic function block 42 and with $c_0$ from the backward substitution block 48. The filter coefficient computation block 50 performs an operation of the following formula (14).

$$w_0 = c_0^H H^H \quad (14)$$

The equalizing device 40 according to the present invention as shown in FIG. 2 equalizes transmitting data from the two transmitting antennas Tx1 and Tx2. Therefore, the illustrated equalizing device 40 has two FIR filters 52 and 54. The filter coefficients ($w_1, w_2: w_g$) of those two FIR filters 52 and 54 are computed by the filter coefficient computation block 50 and supplied to the FIR filters 52 and 54, respectively (Step 5).

In this case, the filter coefficients $w_g$ (i.e., $W_1, W_2$) outputted from the filter coefficient computation block 50 are represented by $w_g = c_0^H H_g^H$. Specifically, the common $c_o^H$ is used to compute the two filter coefficients. As a result, the computation for the filter coefficients is remarkably simplified.

The FIR filters 52 and 54 filter the input data r with the filter coefficients $w_g$ updated temporally (Step 6).

Next, each of the despread function blocks 56 and 58 performs despreading to obtain an estimated symbol value (Sg) corresponding to the gth transmitting antenna (Step 7) and outputs the estimated symbol value (S1 and S2 in this example) to the processing part 60 (Step 8).

The processing part 60 operates as a STTD decoder or a CLM1 phase compensator. Specifically, it is assumed that an output symbol (HS-DSCH/HS-SCCH) corresponding to the gth transmitting antenna in a single slot is expressed by {Sg(0),Sg(1),Sg(2), ... }.

In the case of the STTD method, the output of the processing part 60 is $\underline{S}(0), \underline{S}(1), \underline{S}(2) \ldots$ A recovery symbol is outputted in accordance with the following formulas.

$$\underline{S}(2i) = S1(2i) + S2(2i+1)^*$$

$$\underline{S}(2i+1) = S1(2i+1) - S2(2i)^*$$

i=0, 1, 2 ...

On the other hand, in the case of the CLM1 method, the output $(\underline{S}(0), \underline{S}(1), \underline{S}(2))$ of the processing part 60 is $$\underline{S}(i) = S1(i) + S2(i) \times W2$$

where i=0, 1, 2, ... and W2 is a weight of the second transmitting antenna.

As described above, according to the process of the present invention, the computation for filter coefficients of a plurality of FIR filters used in a transmit diversity method can remarkably be simplified as compared to a case where an inverse matrix $G^{-1}$ is used.

INDUSTRIAL APPLICABILITY

The present invention can be applied to receivers, equalizers, and the like which have a plurality of FIR filters and computes filter coefficients of the FIR filters with an inverse matrix. Furthermore, the present invention is applicable to systems using not only an STTD method and a CLM1 method but also various types of transmit diversity methods.

The invention claimed is:

1. A receiver comprising:
   a plurality of FIR filters and communicable with a transmitting part using a transmit diversity method through a transmission path with use of the plurality of FIR filters; and
   a processing arithmetic circuit operable to compute a filter coefficient w of each of the FIR filters with a common factor ($c_0$) and output the filter coefficients w to the plurality of FIR filters,
   wherein the filter coefficient is represented by the following formula:

$$w_g = c_0^H H_g^H \quad (1)$$

where g is 1 or 2, the superscript H represents a Hamilton transpose, and $H_g$ is an estimated channel response matrix of the transmission path.

2. The receiver in claim 1, wherein the common factor $c_0$ is derived by representing a gain matrix G of the transmission path by the following formula by the use of channel response matrices $H_1$ and $H_2$ corresponding to the transmit diversity method:

$$G = H_1^H H_1 + H_2^H H_2 + \beta I \quad (2)$$

where β is a noise figure added in the transmission path, and I is a unit matrix.

3. The receiver in claim 2, wherein the common factor $c_0$ is computed by performing forward substitution and backward substitution on a lower triangular matrix L obtained by performing Cholesky decomposition on the formula (2).

4. The receiver in claim 3, wherein the forward substitution is performed by computing a row vector d in accordance with the following formula:

$$Ld = e_{(N+1)/2} = [e_1, e_2, \ldots e_N]^T \quad (3)$$

where N is the number of vector components of a matrix, $e_i$ is a column vector having 1 in cases of i=(N+1)/2 and 0 in other cases.

5. The receiver in claim 4, wherein d=d[(N−1)/2,(N−2)/2, ... N−1] is used as the row vector d for the subsequent backward substitution.

6. The receiver in claim 5, wherein the backward substitution comprises computing the common factor $c_0$ in accordance with the following formula (4):

$$L^H c_0 = d \quad (4)$$

where $$L^H[i,j] = L^H[i+(N-1)/2, j+(N-1)/2] \; \forall 0 \leq i,j \leq (N-1)/2.$$

7. The receiver in claim 6, wherein the common factor $c_0$ is represented by the following formula (5):

$$c_0[(N-1)/2+k] = \underline{c}_0[k], c_0[k] = c_0[N-1k]^*, \; k=0, \ldots, (N-1)/2 \quad (5)$$

8. The receiver in claim 7, wherein the filter coefficient w is derived by performing Hamilton transpose on the common factor $c_0$ obtained by the formula (5) to obtain $c_0^H$ and then performing the computation of the formula (1).

9. The receiver in claim 8, wherein the receiver is used to communicate with a transmitting part which transmits symbols Sg(0), Sg(1), Sg(2), . . . (g=1 or 2) to HS-DSCH/HS-SCCH via two transmitting antennas by selectively using an STTD method and a CLM1 method as the transmit diversity method, and the receiver has a processing part operable to output symbol estimates S(0), S(1), S(2), . . . in accordance with the formula (6) in the case of the STTD method and in accordance with the formula (7) in the case of the CLM1 method:

$$S(2i)=S1(2i)+S2(2i+1)^*, \ S(2i+1)=S1(2i+1)-S2(2i)^* \quad (6)$$

$$S(i)=S1(i)+S2(i) \times W2 \quad (7)$$

where i=0, 1, 2, . . . and W2 is a weight corresponding to a second transmitting antenna.

* * * * *